(12) United States Patent
Bourgoin

(10) Patent No.: US 9,363,364 B2
(45) Date of Patent: Jun. 7, 2016

(54) METHOD FOR CORRECTING TELEPHONE SIGNAL DEGRADATION CAUSED BY THE LENGTH OF THE ANALOG LINE VIA THE RECEIVER

(75) Inventor: Gilles Bourgoin, Rueil-Malmaison (FR)

(73) Assignee: SAGEMCOM BROADBAND SAS, Rueil-Malmaison (FR)

( * ) Notice: Subject to any disclaimer, the term of this patent is extended or adjusted under 35 U.S.C. 154(b) by 0 days.

(21) Appl. No.: 13/321,045

(22) PCT Filed: May 27, 2010

(86) PCT No.: PCT/EP2010/057309
§ 371 (c)(1),
(2), (4) Date: Nov. 17, 2011

(87) PCT Pub. No.: WO2010/136518
PCT Pub. Date: Dec. 2, 2010

(65) Prior Publication Data
US 2012/0063588 A1    Mar. 15, 2012

(30) Foreign Application Priority Data

May 29, 2009   (FR) ..................... 09 53561

(51) Int. Cl.
*H04M 7/04*   (2006.01)
*H04M 1/76*   (2006.01)
*H04M 1/74*   (2006.01)

(52) U.S. Cl.
CPC . *H04M 1/76* (2013.01); *H04M 1/74* (2013.01)

(58) Field of Classification Search
CPC ...... H04N 7/108; H04M 1/76; H04M 11/062; H04M 1/60; H04M 1/6008; H04M 1/6016; H04M 1/6025; H04M 1/6066; H04M 1/74; H04M 1/82; H04M 9/08; H04M 3/248; H04M 3/28; H04M 3/301; H04M 3/30; H04M 1/24; H04M 3/42323; H04M 15/08; H04M 19/006; H04Q 3/00; H04B 3/16
USPC .......... 379/13, 22–22.07, 32.02, 207.04, 246, 379/340, 377, 394, 395, 400
IPC ............... H04M 3/248, 3/28, 3/301, 3/30, 1/24, H04M 3/42323, 15/08, 1/82, 1/76, 1/60, 19/006; H04Q 3/00; H04B 3/16
See application file for complete search history.

(56) References Cited

U.S. PATENT DOCUMENTS 3,810,032 A   5/1974  Van der Plaats
4,459,698 A * 7/1984  Yumoto ............ H04L 25/03019
                                                          333/18

(Continued)

FOREIGN PATENT DOCUMENTS

EP   0 550 316   7/1993
FR   2 478 412   9/1981

OTHER PUBLICATIONS

International Search Report for PCT/EP2010/057309, mailed Aug. 18, 2010.

(Continued)

*Primary Examiner* — Akelaw Teshale
(74) *Attorney, Agent, or Firm* — Nixon & Vanderhye, P.C.

(57) ABSTRACT

The present invention relates to the field of telephony and specifically to a method for correcting the degradation of telephone signal quality caused by analogue lines. The invention describes managing, via the receiver, a specific correction of telephone signal degradation caused by the length of the analogue line between the parties. Said line length between the receiver and the telephone switchboard to which said receiver is connected is stored in the receiver. Advantageously, the line lengths between the receiver of the called party and the corresponding switchboard are stored, for example in the director of the apparatus. During the call, said line length is taken into account by a specific correction means for said correction inside the receiver.

2 Claims, 3 Drawing Sheets

(56) References Cited

U.S. PATENT DOCUMENTS

| | | | | |
|---|---|---|---|---|
| 4,799,216 A | * | 1/1989 | Johnson | H04Q 11/04 370/364 |
| 5,898,764 A | * | 4/1999 | Yoshida | 379/100.17 |
| 7,729,477 B2 | * | 6/2010 | Shrikhande et al. | 379/22 |
| 2003/0086478 A1 | * | 5/2003 | Lee et al. | 375/130 |

OTHER PUBLICATIONS

Foreign-language Written Opinion of the International Searching Authority for PCT/EP2010/057309, mailed Aug. 18, 2010.

* cited by examiner

| Line length (km) | Low-frequency correction (dB) | High-frequency correction (dB) |
|---|---|---|
| 0 | 0 | 0 |
| 1 | 2.4 | 3.7 |
| 2 | 4.8 | 7.4 |
| 3 | 7.2 | 11.1 |
| 4 | 9.6 | 14.8 |
| 5 | 12 | 18.5 |
| 6 | 14.4 | 22.2 |
| 7 | 16.8 | 25.9 |
| 8 | 19.2 | 29.6 |

Fig. 5

METHOD FOR CORRECTING TELEPHONE SIGNAL DEGRADATION CAUSED BY THE LENGTH OF THE ANALOG LINE VIA THE RECEIVER

This application is the U.S. national phase of International Application No. PCT/EP2010/057309, filed 27 May 2010, which designated the U.S., and claims priority to FR Application No. 09/53561, filed 29 May 2009, the entire contents of which is hereby incorporated by reference.

The present invention concerns the field of telephony and more particularly a method of correcting degradations in the quality of the telephone signal caused by the analogue lines.

Unlike digital telephones such as mobile telephones or IP (Internet Protocol) telephones, analogue telephones are connected to a telephone switchboard by an analogue line the length of which may vary from few meters to several kilometers. The telephone signal carrying the voice of the speaker is transmitted on this line in an analogue fashion. This analogue transmission gives rise to a degradation in the telephone signal. This degradation results in an attenuation and a change in timbre of the voice. It is dependent on the total length of the analogue line between the two speakers, whether on the caller side or on the call destination side.

Today, in telephones of the prior art, this degradation is not specifically corrected. Some telephones include an equaliser in the receiver for generating a gain curve as a function of the frequency for the signals recorded by the microphone or emitted by the loud speaker. This equaliser is used to correct the deformation of the telephone signal due to the physical properties of the receiver in which the microphone is inserted and the loudspeaker. Some receivers offer the possibility for the user to adjust this equaliser according to their tastes. This adjustment is then applied to all calls and does not take account of the analogue line lengths between the speakers.

The invention aims to solve the above problems by the management by the receiver of a specific correction to the degradation of the telephone signal due to the analogue line length between the speakers. This line length between the receiver and the telephone switchboard to which it is connected is stored on the receiver. Advantageously, the line length between the receiver of the destination and its telephone switchboard are stored, for example, within the directory of the apparatus. During a call, this line length is taken into account by specific correction means for this correction within the receiver.

The invention concerns a telephone receiver that comprises means of storing an analogue line length between the subscriber and the destination of a call and means of specifically correcting the degradation of the telephone signal caused by the analogue line length.

According to a particular embodiment of the invention, the means of storing the analogue line length comprise means of storing a local analogue line length between the subscriber and the telephone network and means of storing a distant analogue line length between the telephone network and the destination of the call. The means of specifically correcting the degradation of the telephone signal caused by the distant analogue line length comprise means of correcting the local and distant analogue line length.

According to a particular embodiment of the invention, the receiver comprises means of selecting an operating mode among the following modes:

a disengaged correction mode where no correction to the degradation of the telephone signal caused by the analogue line length is made;

a local correction mode where only the correction to the degradation of the telephone signal caused by the local analogue line length is made;

a distant correction mode where only the correction to the degradation of the telephone signal caused by the distant analogue line length is made;

a total correction mode where the correction to the degradation of the telephone signal caused by the local and distant analogue line length is made.

According to a particular embodiment of the invention, the correction means comprises a digital equaliser programmed by a continuous gain function according to the analogue line distance to be corrected and the frequency of the telephone signal.

According to a particular embodiment of the invention, the correction means comprises means of applying gain steps according to the analogue line distance to be corrected and the frequency of the telephone signal.

According to a particular embodiment of the invention, the means of applying the gain steps consist of analogue filters.

The invention also concerns a method of correcting the degradation of the telephone signal caused by the analogue line length between the speakers that comprises a step of obtaining the analogue line length to be corrected and a step of programming the correction means according to said analogue line length obtained.

The features of the invention mentioned above, as well as others, will emerge more clearly from a reading of the following description of an example embodiment, said description being given in relation to the accompanying drawings, among which:

FIG. 5 illustrates the correction steps used in a particular embodiment of the invention.

Figure 1:
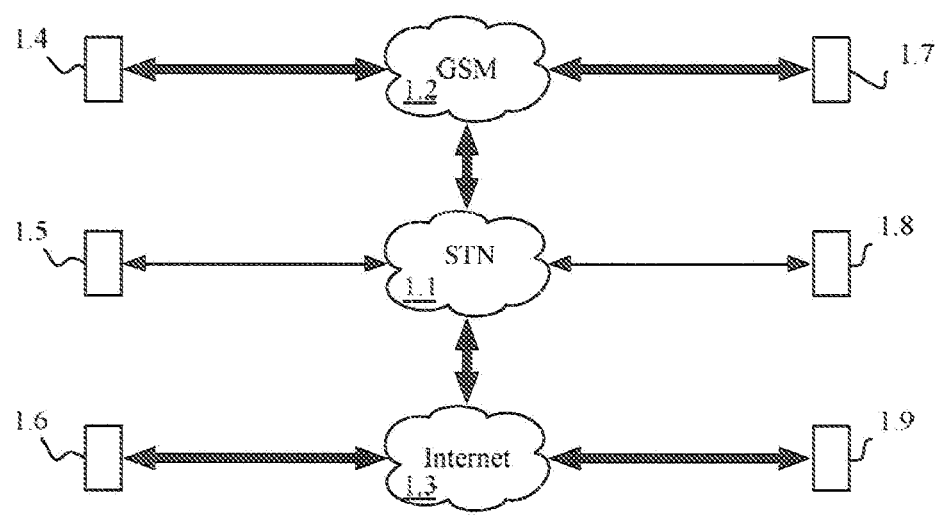
FIG. 1 illustrates the global architecture of the telephone network.

The modern telephone system consists today many networks for connecting together receivers functioning according to different technologies. This is illustrated schematically by FIG. 1. The conventional telephone network, referred to as STN, standing for Switched Telephone Network, 1.1, makes it possible to connect analogue receivers 1.5 and 1.8. When the mobile telephone was developed, the STN network was connected to this mobile telephone network 1.2, referred to as the GSM network (Global System for Mobile communications). Mobile handsets 1.4 and 1.7 can thereby communicate with each other, but also with analogue receivers 1.5 and 1.8. In parallel, the global data transfer network, the internet, 1.3 has developed, connecting together various information processing devices. On this network, digital voice transfer technologies have been developed, opening the way to the appearance of digital telephone on the IP network, known by the abbreviation VoIP (Vox over IP) which now enables digital receivers based on these technologies to be connected. These receivers, integrating computers, make it possible to establish telephone communications with each other and also to analogue receivers in the STN network and mobile handsets in the GSM network. The term GSM network covers here all mobile telephony networks, whatever the protocol actually used, such as GPRS, UMTS or protocols grouped together under the 3G protocol name.

Here telephone receiver means any electronic device for establishing a telephone call. This device includes in particular analogue telephone terminals including radio handsets of the DECT (Digital Enhanced Cordless Telephone) type, mobile telephony terminals, computers provided with telephony software, some personal assistants, some GPS terminals on board vehicles or the like.

Apart from analogue handsets connected to the STN network, the majority of these handsets are digital. Analogue receiver means a receiver emitting the telephone signal transmitting the voice in an analogue fashion, typically over an analogue line. Falling within this category are wireless or cable telephones, typically according to the DECT or Cat-IQ (Cordless Advanced Technology—internet and quality) standards, where the base is connected in an analogue fashion to the telephone exchange although communicating digitally with the handsets strictly speaking according to a radio transmission technology. In the latter case, the concept of telephone receiver is extended to the base, the invention being able to be implemented within handsets or in the base.

Digital receiver means a receiver where the telephone signal transmitting the voice is converted digitally on the receiver and where this receiver emits a digital telephone signal in order to transmit the voice to the network.

Figure 2:
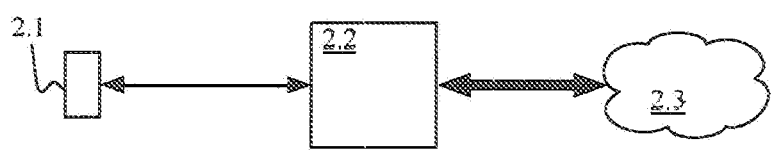
FIG. 2 illustrates the connection of an analogue receiver to the telephone network.

FIG. 2 illustrates the functioning of the transmission of the telephone signal between an analogue receiver and the telephone network. The receiver 2.1 is connected by an analogue line to the telephone exchange 2.2. The exchange is itself connected by a digital communication network to the telephony network 2.3. When the terminal 2.1 establishes a communication with a speaker, his voice is transformed into an analogue telephone signal by the microphone of the receiver. This telephone signal is then transmitted over the analogue line to the telephone exchange 2.2. This analogue telephone signal is then converted to digital by the exchange. It is then a digital telephone signal transporting the voice that is transmitted via the telephone network 2.3 to the destination.

When this destination is also equipped with an analogue receiver, the reverse operation is performed. The telephone signal arrives digitally as far as the telephone exchange of the destination. It is then converted to analogue by this exchange and then transmitted in an analogue fashion to the receiver via the analogue line connecting the exchange to the receiver in order to be reproduced by the loudspeaker of the receiver. The voice of the destination follows an identical transmission scheme in the reverse direction.

When this destination is equipped with a digital receiver, the digital telephone signal is transmitted to the receiver and is converted therein to analogue within the receiver in order to supply the loudspeaker. Here also, the voice of the destination follows an identical path in the reverse direction. In this case, the line length is zero on the destination side.

Figure 3:
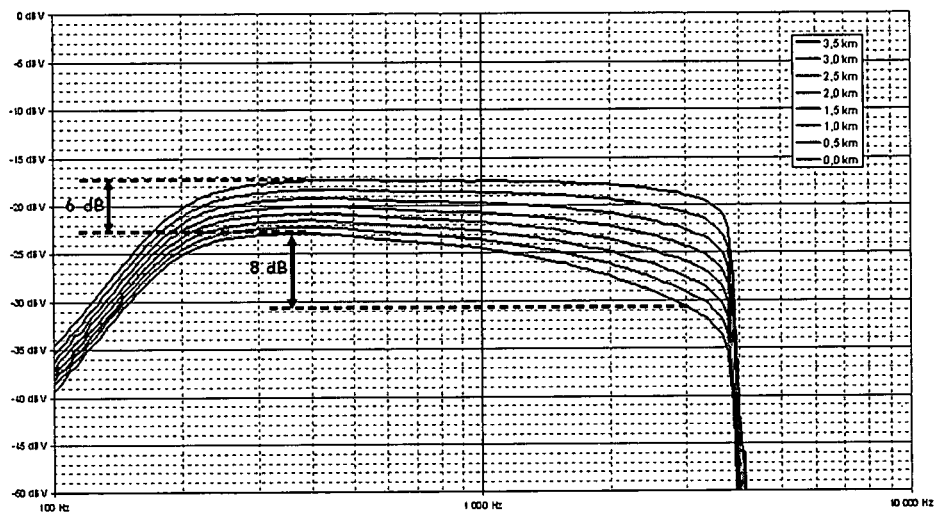
FIG. 3 illustrates the degradations affecting the telephone signal transmitted by analogue line.

FIG. 3 illustrates the degradation of the telephone signal as a function of the frequency for different line lengths. It can be seen that the telephone signal is attenuated overall. This attenuation varies by around 6 dB in the 300 Hz frequency range between a zero distance and a distance of 3.5 km. At the latter distance, it is also seen that the attenuation is greater by 8 dB for a 1300 Hz frequency compared with a frequency of 300 Hz. During a communication involving at least one analogue receiver, the telephone signal of the voice transmitted is therefore degraded. This degradation is non-uniform according to the frequency and depends on the total analogue line length over which the telephone signal passes between the speakers.

It is possible to correct this degradation by applying a suitable equalisation to the telephone signal. This correction makes it possible to correct the relatively greater attenuation at high frequencies compared with low frequencies. It may for example be done by applying the following formula:

$$C = L \cdot \frac{20}{7}(\mathrm{Log}_{10}(F) - 2)$$

where F is the frequency expressed in Hz, L is the length of the line to be corrected in km and which gives the correction C for this frequency in the form of a gain in dB to be applied to the telephone signal.

Figure 4:
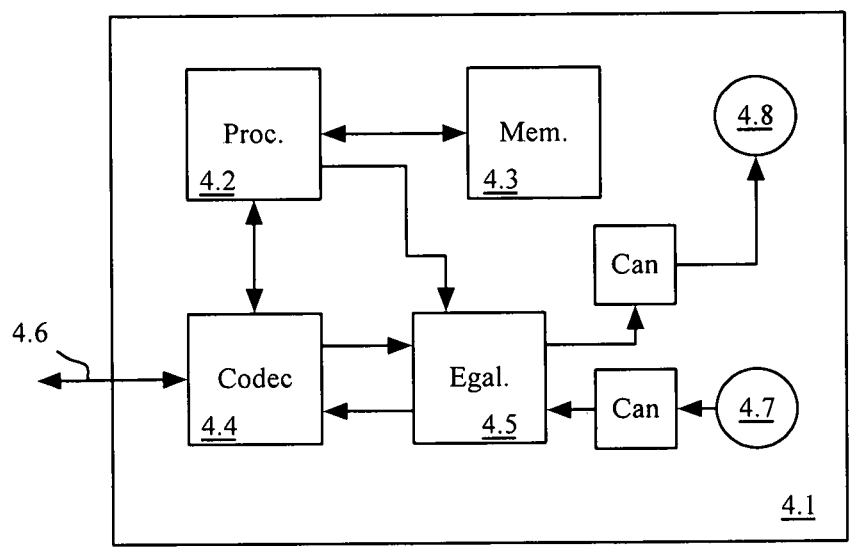
FIG. 4 illustrates the architecture of an example embodiment of the invention.

FIG. 4 illustrates an example embodiment of the invention. In this example, the invention is implemented in the receiver of a domestic wireless telephone system of the DECT type 4.1. In this system, the telephone signal is received digitally 4.6 from the DECT base itself connected in an analogue fashion to the telephone exchange. The telephone signal is then decoded by the codec 4.4. It then undergoes an equalisation treatment carried out by the equaliser 4.5 before being converted into analogue by an analogue to digital converter or ADC in order to be emitted by the loudspeaker 4.8. The voice captured by the microphone 4.7 is converted to digital by an ADC before undergoing equalisation treatment by the equaliser 4.5 before being encoded by the codec 4.4 in order to be sent to the network by the wireless digital interface 4.6. The receiver functions under the control of a processor 4.2. This processor executes a set of control software housed in a memory space 4.3. In particular it controls the coding decoding module 4.4 and the digital equaliser 4.5. This equaliser is typically used to correct deformations in the sound caused by the particular implementation of the transducers within the receiver. According to the invention, the memory 4.3 also constitutes a means of storing the analogue line length between the subscriber and the telephone system referred to as the local analogue line length. Typically, this memory also contains the telephone directory of the subscriber. Advantageously, this directory also contains, for each destination present in the directory, information on the analogue line lengths between the receiver of the destination and the telephone network, referred to as the distant analogue line length. This line length is set to zero in the case of a mobile receiver or one based on IP.

The presence in the information storage means 4.3 of these analogue line lengths, both local and distant, enables the call management software to program the equaliser 4.5 in order to specifically correct the degradation in the telephone signal caused by the analogue line length. This digital equaliser can be programmed by means of the function described in the above equation, which then constitutes a continuous gain function as a function of the analogue line length to be corrected and the frequency of the telephone signal. This software, with the line length information present in the storage means of the memory 4.3 and the equaliser 4.5, then constitutes a means of specific correction of the degradation in the telephone signal caused by the analogue line length between two speakers during a call.

Advantageously, the same correction is applied to the telephone signal received from the destination of the call and to the telephone signal sent to the destination of the call.

This correction means then comprises means of calculating the total analogue line length associated with a given call, means of programming the equaliser for correcting the degradation in the telephone signal caused by this analogue line length. It then implements a method of correcting the degradation in the telephone signal caused by the analogue line length that comprises a step of obtaining the analogue line length to be corrected and a step of programming the correction means as a function of said analogue line length obtained.

Advantageously, the correction can be done according to several modes. In a first mode, referred to as total mode, the equaliser is programmed to correct the degradations caused by the whole of the analogue line length, local and distant, between the subscribers. In a second mode, referred to as local mode, only the local analogue line length is corrected and not the distant analogue line length. In a third mode, referred to as distant mode, only the distant analogue line length is corrected and not the local analogue line length. Finally, in a fourth mode, referred to as disengage mode, no correction is made. Advantageously, these different modes can be selected by the user during a call. This makes it possible among other things to be able to manage a call between two appliances having the invention available and avoiding a double correction that will be made by the two appliances and which would both correct the whole of the degradation both local and distant. In this embodiment, the correction is then made continuously according to the frequency.

The invention can be implemented by an analogue telephone receiver as described in the example embodiment. However, it can also be implemented by a digital telephone receiver. In this case, the local analogue line length is zero, and only the degradation of the telephone signal caused by the distant analogue line length can where necessary be corrected.

The correction can be entrusted to an equaliser present in the receiver for other corrections or to a specific equaliser dedicated to this correction according to circumstances.

Alternatively, the correction can be made not continuously but by applying gain steps as a function of the frequency and distance. This embodiment may be advantageous on low-cost receivers. FIG. 5 illustrates an example of steps applicable in this embodiment. In this table, the low frequencies are the frequencies between 300 Hz and 1 kHz, while the high frequencies are frequencies between 1 kHz and 3 kHz. It indicates for each distance the gain values to be programmed for correcting the degradations in the telephone signal caused by the analogue line length.

Alternatively, for example in a completely analogue receiver where the telephone signal is not converted to digital, the correction may be made by applying analogue filters. Advantageously, the method then uses steps, for example those in FIG. 5, to select the correct filters according to the distance and the frequency of the telephone signal.

The invention claimed is:

1. Telephone receiver intended to be connected to a telephone network via a local analogue line and comprising correction means for correcting a degradation of a telephone signal caused by the length of the local analogue line, wherein the telephone receiver further comprises:
    means for storing first information on the length of the local analogue line between the telephone receiver and the telephone network;
    means for storing second information on the length of a distant analogue line connecting a distant second telephone receiver and the telephone network;
    means for selecting an operating mode from at least one of the following modes:
    a first correction mode in which no correction of the degradation of the telephone signal caused by the length of the local and distant analogue lines is made;
    a second correction mode in which only a correction of the degradation of the telephone signal caused by the length of the local analogue line is made;
    a third correction mode in which only a correction of the degradation of the telephone signal caused by the length of the distant analogue line is made;
    a fourth correction mode in which a correction of the degradation of the telephone signal caused by the length of the local and distant analogue lines is made;
    the correction means comprising a digital equalizer programmed by a continuous gain function or analog filters for applying gain steps according to the stored first and second length information and the frequency of the telephone signal, said correction means being used during a call between the telephone receiver and the distant second telephone receiver.

2. A method of correcting a degradation of a telephone signal caused by an analogue line length between first and second telephone receivers,
    said method comprising a step of correcting the degradation of the telephone signal caused by the length of a local analogue line connecting the first telephone receiver to a telephone network,
    said method being used by said first telephone receiver and wherein said method comprises:
    a step of obtaining first information on the length of the local analogue line,
    a step of obtaining second information on the length of a distant analogue line connecting the second receiver to said telephone network;
    a step of correcting the degradation of the telephone signal according to the obtained first and second length information wherein correction means are used that comprise a digital equalizer programmed by a continuous gain function or analog filters for applying gain steps according to the stored first and second length information and the frequency of the telephone signal, said correction means being used during a call between the telephone receiver and the distant second telephone receiver; and
    a step of selecting an operating mode from at least one of the following modes:
    a first correction mode in which no correction of the degradation of the telephone signal caused by the length of the local and distant analogue lines is made;
    a second correction mode in which only a correction of the degradation of the telephone signal caused by the length of the local analogue line is made;
    a third correction mode in which only a correction of the degradation of the telephone signal caused by the length of the distant analogue line is made;
    a fourth correction mode in which a correction of the degradation of the telephone signal caused by the length of the local and distant analogue lines is made.

* * * * *